United States Patent
Tomita et al.

Patent Number: 5,516,390
Date of Patent: May 14, 1996

[54] METHOD OF SEALING A VEHICLE LIGHTING FIXTURE

[75] Inventors: Atsushi Tomita; Yuichiro Kamei, both of Aichi, Japan

[73] Assignee: Aica Kogyo Co., Ltd., Aichi, Japan

[21] Appl. No.: 262,677

[22] Filed: Jun. 20, 1994

[30] Foreign Application Priority Data

Jul. 21, 1993 [JP] Japan .................. 5-201763

[51] Int. Cl.⁶ .................. B32B 1/04; C09J 11/04
[52] U.S. Cl. .................. 156/108; 156/87; 156/304.2; 156/304.5; 156/325; 156/292; 106/467; 362/267
[58] Field of Search .................. 156/304.2, 304.5, 156/292, 145, 146, 79, 87, 325, 99, 108, 109; 106/122, 467, 820, 626; 362/158, 267, 310, 329; 359/512, 513; 52/171.3; 428/34, 38, 192

[56] References Cited

U.S. PATENT DOCUMENTS

| | | | |
|---|---|---|---|
| 3,784,807 | 1/1974 | Boekkooi et al. | 362/267 |
| 4,240,853 | 12/1980 | Pustka | 156/290 X |
| 4,414,693 | 11/1983 | Brody | 359/512 X |
| 4,425,607 | 1/1984 | Shanks | 362/158 X |
| 4,622,249 | 11/1986 | Bowser | 428/34 |
| 4,741,779 | 5/1988 | Mita et al. | 106/467 |
| 4,994,309 | 2/1991 | Reichert et al. | 428/34 |
| 5,030,284 | 7/1991 | Withiam | 106/409 |
| 5,156,894 | 10/1992 | Hood et al. | 428/34 |
| 5,176,441 | 1/1993 | Horvath et al. | 362/267 |
| 5,188,444 | 2/1993 | Makita et al. | 362/267 X |

FOREIGN PATENT DOCUMENTS 321682  1/1991  Japan .

Primary Examiner—Michael W. Ball
Assistant Examiner—Francis J. Lorin

[57] ABSTRACT

A lighting fixture body and a lens, both formed of plastic which generates gas when heated, are bonded together, using a hot melt adhesive with adsorbent mixed therein, thereby preventing foams from residing in the interface between the plastic materials and the hot melt adhesive. The hot melt adhesive is mainly composed of styrene-ethylene-butylene block copolymer, and molecular sieve or other adsorbent having adsorbing cavities is added to the hot melt adhesive. After the hot melt adhesive is filled in the sealing grooves of the lighting fixture body, the anchoring parts of the lens are set in the hot melt adhesive and fastened mechanically with spring pegs. The hot melt adhesive solidifies in the sealing grooves, thereby fixing the lighting fixture body and the lens together.

6 Claims, 1 Drawing Sheet

METHOD OF SEALING A VEHICLE LIGHTING FIXTURE

FIELD OF THE INVENTION

This invention relates to a method of bonding an automobile headlight or other lamp body (hereinafter referred to as the lighting fixture body) to a lens covering the opening in the body, by using a hot melt adhesive, and particularly to a method of bonding the body to the lens both formed of polycarbonate, acrylic resin or other plastic material, without generating foam or bubbles on the interface between the plastic material and the hot melt adhesive.

BACKGROUND OF THE INVENTION

The material of a lighting fixture body and a lens forming a conventional vehicle lighting fixture has been changed from metal or glass to polycarbonate or acrylic resin. The polycarbonate, acrylic resin or other plastic material is superior in impact strength, thermal stability, electric characteristics, antiweatherability and dimensional stability.

The hot melt adhesive having thermal plasticity is the agent mainly used for bonding the body and the lens of the lighting fixture, because it has a high adhesion and provides high productivity.

In the conventional method, the hot melt adhesive is heated and melted at between about 190° C. and about 200° C., and applied using a hot melt adhesive applicator to the sealing grooves integrally formed in the molded polypropylene resin lighting fixture body. Subsequently, the anchoring parts of the lens are press-fit into hot melt adhesive in the sealing grooves, and fixed mechanically by using spring pegs or other.

When the polycarbonate lighting fixture body and lens are thus bonded together and heated to between 60° C. and 120° C., however, water molecules, carbon dioxide and other low molecular weight compounds are generated from polycarbonate and reside as foam in the interface between polycarbonate member and hot melt adhesive, thereby deteriorating the bonding or sealing properties.

The similar phenomenon is found when the acrylic resin lighting fixture body and lens are bonded together.

To solve such problem, polycarbonate resin is heated and dried so as to remove hydrogen oxide, carbon dioxide and other low molecular weight compounds in advance before it is applied in assembling the lighting fixture body and the lens. For this purpose, the heating apparatus and process are required.

Japanese Laid-open Patent Application No. 3-21682 discloses another solution. In the prior art, after the hot melt adhesive is melted, during a series of process for applying the hot melt adhesive to the plastic, pressure is reduced by no less than 500 mmHg. At the additional step of degassing the hot melt adhesive, the residual foam is eliminated from the interface between the plastic and the hot melt adhesive. Therefore, the prior art requires the additional step of pressure reduction and degassing, and the associated apparatus.

SUMMARY OF THE INVENTION

Wherefore, an object of this invention is to provide a method of bonding together a lighting fixture body and a lens, both made of plastic which generates gas when heated, following the conventional method, thereby obviating the apparatus and process step for heating the plastic, reducing pressure and degassing the hot melt adhesive. To attain this or other object, the present invention provides a method of bonding together a lighting fixture body and a lens both made of plastic, which generates gas when heated, by using the hot melt adhesive mixed with the adsorbent having gas adsorbing cavities. The method is composed of the steps of adding adsorbent having gas adsorbing cavities to a hot melt adhesive, so as to mix and disperse the adsorbent in the hot melt adhesive; filling the hot melt adhesive containing the adsorbent having gas adsorbing cavities, in grooves formed beforehand in the lighting fixture body of plastic; inserting anchoring parts of the lens of plastic into the grooves, until the hot melt adhesive solidifies to strengthen the engagement of the anchoring parts in the grooves.

For the plastic material constituting the vehicle lighting fixture of the present invention, polycarbonate, acrylic resin and other synthetic resin, which generates water molecules, carbon dioxide and other gas when heated, are most effectively used. Polypropylene, nonyl phenol resin or other engineering plastic can also be used.

The hot melt adhesive as the sealing compound is mainly composed of thermoplastic polymer. Additionally, tackifier, softener, filler or other known modifying agent, and the adsorbent having adsorbing cavities are mixed in the hot melt adhesive. For the polymer, butyl synthetic rubber, styrene-isoprene-styrene copolymer, styrene-ethylene-butylene block copolymer, ethylene-propylene rubber, acrylic rubber, polyester elastomer, ethylene-vinyl acetate copolymer, ionomer resin, ethylene-acrylate copolymer, and polyamide resin or other thermoplastic elastomer are used individually or mixedly. Among these polymers, the polymer mainly composed of styrene-ethylene-butylene block copolymer has the optimum adhesive properties. As the tackifier, terpene resin, terpene phenolic resin, colophony or hydrogenated colophony resin, and petroleum resin or hydrogenated petroleum resin are used in an individual or mixed form. As the softener, atactic polypropylene, polybutene, isobutylene, paraffin oil and naphthene oil are used in an individual or mixed form. As the filler, talc, clay, silica, calcium carbonate, titanium oxide or other ordinary filler used for paint and adhesive is used.

As the adsorbent having gas adsorbing cavities added to the hot melt adhesive, available are molecular sieve 3A, 4A, 5A and 10X (synthetic zeolite manufactured by Toyo Soda including various types of Zeolam). Furthermore, available are natural zeolite or chabazite, gmelinite, levynite, erionite, mordenite, analcite, Hojacite (product of Nitto Funka Kogyo and Nitto Zeolite), silica gel (including various kinds of Syloid), silica magnesia gel (for example, Nikka Gel M manufactured by Nihon Kassei Hakudo), silica alumina gel (for example, Nikka Gel S manufactured by Nihon Kassei Hakudo), activated carbon and activated alumina. These adsorbents are used in an individual or mixed form. Among the adsorbents, most appropriate is the molecular sieve having superior absorbing properties even under 10 mmHg or lower partial pressure and even at 50° C. or higher temperature. The particle size of the molecular sieve is preferably between 2 μm and 30 μm. Preferably, 5 to 50% by weight of the molecular sieve is contained relative to the entire hot melt adhesive. If the molecular sieve less than 5% by weight is added, the gas adsorbing properties would be deteriorated, and if the molecular sieve more than 50% by weight is added, the adhesive properties would be deteriorated.

To prepare the hot melt adhesive, the aforementioned components are mixed with a sigma-type kneader or other mixer.

BRIEF DESCRIPTION OF THE DRAWINGS

The invention will now be described, by way of example, with reference to the drawings, in which.

DETAILED DESCRIPTION OF THE PREFERRED EMBODIMENTS

EMBODIMENT 1

Figure 1:
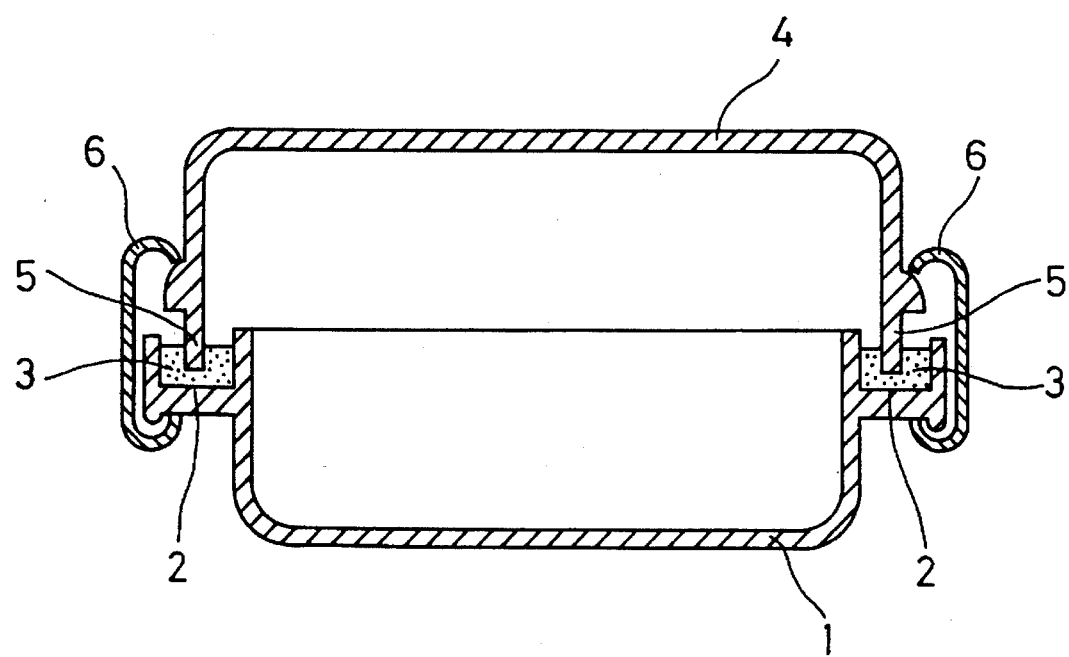
FIG. 1 is a vertical cross-sectional view of the lighting fixture manufactured using the adhesive sealing method according to the invention.

The hot melt adhesive of the embodiment was manufactured by mixing 40 parts of styrene-ethylene-butylene block copolymer (for example, Kraton G-1650 manufactured by Shell Chemical), 20 parts of 55° C. paraffin wax (for example, the product of NIPPON SEIRO CO., LTD.) and 10 parts of molecular sieve (for example, Zeolam A-4 manufactured by Toyo Soda) with a sigma-type kneader.

REFERENCE EXAMPLE 1

Different from the first embodiment, the molecular sieve as the adsorbent was not mixed in the hot melt adhesive of the reference example 1.

As shown in FIG. 1, the hot melt adhesive of first embodiment and that of the first reference example were respectively heated to about 190° C. and melted in the hot melt adhesive applicator, fed through the gun hose connected to the applicator, and discharged from the nozzle of the hose to sealing grooves 2 in the lighting fixture body 1 of polycarbonate. Immediately after the hot melt adhesive was thus filled in the sealing grooves 2, anchoring parts 5 of a lens 4 of polycarbonate were set in the melted hot melt adhesive 3. The anchoring parts 5 were fixed externally with spring pegs 6, and the hot melt adhesive 3 was cooled to the room temperature to solidify. Thus, the adhesive sealing process was completed.

After completing the adhesive sealing process, the lighting fixture was kept stationary for 72 hours at 80° C. Subsequently, the presence of foam was checked on the interface between the hot melt adhesive and the polycarbonate members. The hot melt adhesive of the first embodiment had no foam both immediately after the completion of the adhesive sealing process and after the lighting fixture was kept stationary. The hot melt adhesive of the first reference example, however, generated foam both immediately after the adhesive sealing process was completed and after the lighting fixture was kept stationary.

In the same way as aforementioned, the hot melt adhesive of the first embodiment and that of the first reference example were melted at 190° C. and used for fastening the polycarbonate members together. Immediately after the adhesive sealing process was completed, and after the members were kept stationary for 72 hours at 80° C., the adhesive force at 20° C. was measured and the presence of the foam on the interface between the hot melt adhesive and the polycarbonate members were checked. Results are shown in Table 1.

TABLE 1

|  | EMBODIMENT 1 | REFERENCE EXAMPLE 1 |
| --- | --- | --- |
| ADHESIVE FORCE |  |  |
| IMMEDIATELY AFTER ADHESION | 38 | 20 |
| AFTER BEING KEPT STATIONARY | 35 | 2 |
| FOAM ON THE INTERFACE | NIL | GENERATED |

In the invention, the lighting fixture body and the lens are bonded together using the hot melt adhesive containing the adsorbent. Although these members are made of polycarbonate or other plastic that generates water, carbon dioxide gas or other gas when heated, the adsorbent adsorbs gas. Consequently, according to the invention, the conventional adhesive sealing device can be used while no foam is generated between the hot melt adhesive and the plastic members. No deterioration is caused in the bonding force and sealing effectiveness.

This invention has been described above with reference to the preferred embodiment as shown in the figure. Modifications and alterations may become apparent to one skilled in the art upon reading and understanding the specification. Despite the use of the embodiment for illustration purposes, the invention is intended to include all such modifications and alterations within the spirit and scope of the appended claims.

What is claimed is:

1. A method of bonding a lighting fixture body and a lens both made of plastic which generates gas when heated, comprising the steps of:

adding absorbent having gas absorbing cavities to a hot melt adhesive, so as to mix and disperse said absorbent in said hot melt adhesive;

heating and thereby melting said hot melt adhesive having said absorbent, containing gas absorbing cavities, dispersed therein;

filling melted said hot melt adhesive containing said absorbent having gas absorbing cavities, in grooves provided beforehand in said lighting fixture body of plastic;

inserting anchoring parts of said lens of plastic into said grooves; and placing said lens and said lighting fixture body in close contact until said hot melt adhesive cools down and solidifies, wherein gas generated from said lighting fixture body and/or said lens by the heat of said hot melt adhesive is absorbed by said absorbent having gas absorbing cavities contained in said hot melt adhesive, such that no foam resides in the interface between said lighting fixture body and said lens.

2. A method of bonding according to claim 1, wherein said adsorbent having gas adsorbing cavities is selected from the group consisting of molecular sieve, zeolite, silica gel, silica magnesia gel, silica alumina gel, activated carbon, activated alumina, and the combination of these components.

3. A method of bonding according to claim 1, wherein the particle size of said adsorbent having gas adsorbing cavities is between 2 μm and 30 μm.

4. A method of bonding according to claim 1, wherein the mixture of said hot melt adhesive and said absorbent comprises 5–50% by weight of said absorbent.

5. A method of bonding according to claim 1, wherein said hot melt adhesive is mainly composed of thermoplastic polymer and is further composed of tackifier, softener and filler in addition to said adsorbent having gas adsorbing cavities.

6. A method of bonding according to claim 5, wherein said thermoplastic polymer is selected from the group consisting of butyl synthetic rubber, styrene-isoprene-styrene copolymer, styrene-ethylene-butylene block copolymer, ethylene-propylene rubber, acrylic rubber, polyester elastomer, ethylene-vinyl acetate copolymer, ionomer resin, ethylene-acrylate copolymer, polyamide resin and other thermoplastic elastomer, these components being used individually or mixedly.

* * * * *